United States Patent [19]

Ciani

[11] Patent Number: 4,893,507

[45] Date of Patent: Jan. 16, 1990

[54] DEVICE TO MEASURE THE LEVEL OF LIQUID METAL IN A CRYSTALLIZER OF A CONTINUOUS CASTING INGOT MOULD

[75] Inventor: Lorenzo Ciani, Udine, Italy

[73] Assignee: CEDA SpA Construzioni Elettromeccaniche e Dispositivi d'Automazione, Buttrio, Italy

[21] Appl. No.: 256,468

[22] Filed: Oct. 12, 1988

[30] Foreign Application Priority Data

Oct. 21, 1987 [IT]  Italy ............................... 83479 A/87

[51] Int. Cl.$^4$ ........................................... G01F 23/26
[52] U.S. Cl. ...................................... 73/290 R; 266/94
[58] Field of Search ............. 73/290 R; 340/618, 620; 324/207, 208, 59; 266/94

[56] References Cited

U.S. PATENT DOCUMENTS

| | | | |
|---|---|---|---|
| 3,326,043 | 6/1967 | Roeske et al. | 73/290 R |
| 3,366,873 | 1/1968 | Miller et al. | 73/290 R |
| 3,918,035 | 11/1975 | Eshraghian | 73/290 R |
| 4,007,636 | 2/1977 | Wahl | 73/290 R |
| 4,138,888 | 2/1979 | Linder | 73/290 R |
| 4,144,756 | 3/1979 | Linder | 73/290 R |
| 4,165,641 | 8/1979 | Pomerantz et al. | 73/290 R |
| 4,279,149 | 7/1981 | Block | 73/290 R |
| 4,446,562 | 5/1984 | Friedmann et al. | 73/290 R |
| 4,475,083 | 10/1984 | Linder | 324/233 |

FOREIGN PATENT DOCUMENTS

| | | | |
|---|---|---|---|
| 2004373 | 3/1979 | United Kingdom | 73/301 |
| 8602583 | 5/1986 | World Int. Prop. O. | |

*Primary Examiner*—William A. Cuchlinski, Jr.
*Assistant Examiner*—Diego F. F. Gutierrez
*Attorney, Agent, or Firm*—Wegner and Bretschneider

[57] ABSTRACT

Device to measure the level of liquid metal in a crystallizer of a continuous casting ignot mould, the device employing a source of an electromagnetic field and providing for an emitter coil (17) and at least one receiver coil (18) and including the supply of the emitter coil (17) with at least one high frequency. The emitter coil (17) and receiver coil (18) being located inside a container (15) within the body of the ingot mould in cooperation with a cooling fluid conveyor (11) and being coupled electromagnetically to one single wall of the crystallizer (12) and to the volume within the crystallizer (12).

16 Claims, 3 Drawing Sheets

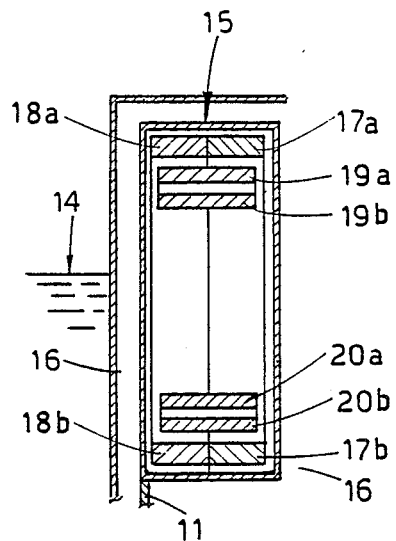
FIG. 2a
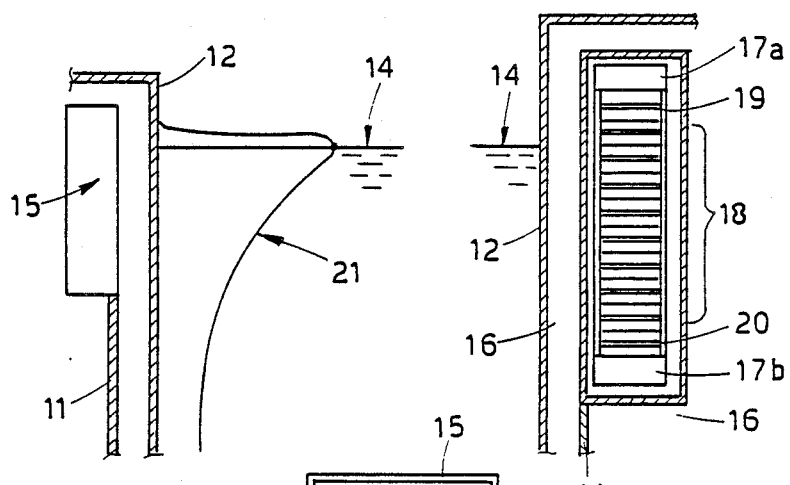
FIG. 3
FIG. 4
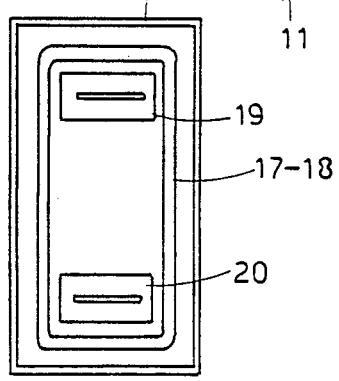
FIG. 2b

DEVICE TO MEASURE THE LEVEL OF LIQUID METAL IN A CRYSTALLIZER OF A CONTINUOUS CASTING INGOT MOULD

This invention concerns a device to measure the level of any conductive molten metal in a crystallizer of a continuous casting ingot mould.

To be more exact, the invention concerns a device suitable to determine the position of the level (or meniscus) of liquid metal within a crystallizer of a continuous casting ingot mould.

The invention can be applied in all cases where the liquid metal and/or the crystallizer are suitable to cooperate with a magnetic field which affects them and gives rise to induced currents.

The article "Advanced mould level control for continuous casting plants" on page 4 of "Metallurgical Plant and Technology" No. 3 of 1985 and U.S. Pat. No. 4,138,888 disclose the use of pairs of coils, one of which provides for transmission of a magnetic field whereas the other is a receiver coil, the coils being positioned on two consecutive or two opposite sides of an ingot mould.

This system does not distinguish between the variations in field received, such variations being determined by the level of the steel and by the variations in resistivity resulting from the variations in temperature of the copper of the crystallizer.

This system is not reliable since it does not make it possible to ascertain what part of the variation received is really a direct and sole effect of the variation in level (in a geometric sense).

BE No. 870.523 of 2.1.79 (Concast AG) discloses systems which employ an electromagnetic source located above the meniscus and facing theretowards. These systems are not only subject to damage but also do not distinguish (like the system mentioned above) between the geometric effect of the variation in level and the thermal effect on the metal of the crystallizer and therefore provide a compound signal.

U.S. Pat. No. 3,366,873 discloses a detector of the level of molten metal in a vessel. This detector provides for subtraction of the signals obtained by two receiver coils.

The detection system suffers from a severe limitation inasmuch as it is absolutely necessary, as stated clearly in column 3, lines 32–36, that the conductivity of the material being monitored should be greater than the conductivity of the ambient above such material.

This situation is exactly the opposite of that in which the device of our present invention operates, where a copper screen of a high conductivity (the crystallizer) is located between the coils and the molten metal.

EP-A-No. 0.077.747 discloses a process for measuring the level of molten metal within an ingot mould. This process provides for the use of a primary coil coaxial with the ingot mould and fed with currents the Fourier analysis of which comprises multiple frequencies, and for the use of a plurality of secondary coils are arranged coaxially about the ingot mould in a zone corresponding with the molten bath.

The process provides for subtraction of the signal obtained from the secondary coil located lowest and acting as a reference coil and of the signals obtained from the other secondary coils.

The primary and secondary coils are positioned coaxially to each other and to the ingot mould.

The coils of the device according to our present invention are likewise positioned coaxially to each other but at a right angle to the axis of the ingot mould. This arrangement entails a smaller general overall bulk of the measurement device/ingot mound assembly and easier access to the ingot mould itself.

Moreover, the process of EP-A-No. 0.077.747 involves a plurality of complicated mathematical calculations, which are considerably simplified, even in the case of only two frequencies acting, by the elimination of some factors.

The measurements therefore are not only difficult to obtain but very imprecise.

This process gives no indication concerning the choice of the frequencies to be used; as this choice depends on the thickness of the crystallizer, the process disclosed in EP-A-No. 0.077.747 does not provide an ordinary person skilled in this field with enough elements to enable him to operate the process efficiently.

The device described in FR-A-No. 2.251.811 is based on the use of induced currents, but it is suitable to work in very different environments from that of the device according to our invention since it requires a containment wall that does not provide elements to disturb the magnetic field.

EP-A-No. 0.087.382 discloses a method to measure the level of molten metal in an ingot mould, the method being based on measurement of the voltages induced in a plurality of secondary coils.

The characteristic lines of the secondary voltages are divided approximately into linear segments. The measurement therefore leaves room for successive approximations.

Contrary to the disclosure of our present invention, the method of EP-A-No. 0.087.382 does not provide for any measurement and comparison of frequencies.

The present applicant has designed, tested and embodied this invention so as to be able to determine the position of the level of liquid metal in a crystallizer of an ingot mould by means of a device located within the body of the mould and positioned on a side of the cooling fluid conveyor that cooperates with the crystallizer.

The invention is therefore embodied with a device which is not harmed by the molten metal and can be easily fitted also to machines which have not been prepared beforehand.

Moreover, the device according to the invention enables different methods, both direct and indirect, to be obtained for monitoring the position of the meniscus of liquid metal within the crystallizer.

According to one possible embodiment of the invention two coupled coils are included which substantially face each other or coincide, one of the coils emitting a magnetic field, whereas the other coil receives the main component generated by the emitter coil and the reaction component generated by the liquid metal and by the crystallizer.

The two coils are coupled to a vertical or oblique extent of a wall of the crystallizer and of the volume which can be charged with liquid metal within the crystallizer, such extend being equal to the range of variation of level which it is desired to monitor.

According to a variant a third receiver coil is also comprised and has the function of monitoring the upper limit of the level of metal.

According to a further variant a fourth receiver coil is also comprised and has the function of monitoring the lower limit of the level.

The third and fourth coils are coupled to two zones of a limited extent which are respectively in the neighbourhood of the top and bottom ends of the range of variation of the level of liquid metal to be monitored.

According to yet another variant, instead of a receiver coil consisting of one single body, a plurality of adjacent coils are provided which are located between the two pairs of coils that determine the upper limit and lower limit respectively of the level.

The emitter coil and the receiver coils do not necessarily have their axes parallel. Instead, it may be advantageous, owing to the sensitiveness of the measurement device, that the axes of the receiver coils should be disposed parallel to each other but inclined in relation to the axis of the emitter coil since this arrangement produces a smaller effect of the direct signal on the overall signal picked up by the receiver coils. The invention is based on the following concept.

The metal within the crystallizer is partly liquid and partly solid and, where steel is in question, is not ferromagnetic in view of the high temperature involved.

According to one embodiment of the invention the coil which emits the magnetic field is fed at the same time with two separate alternate voltages having two characteristic frequencies, one of which is characterized by a low value, whereas the other is characterized by a high value.

The low value is correlated with the physical and geometric characteristics of the crystallizer and is selected in such a way that the attenuation undergone by the magnetic field during its passage through the crystallizer is of a modest nature.

The low value must not be less than certain limits which determine the speed of response of the monitoring system.

According to the invention the low frequency may suitably be between 8 and 60 Hz, but other higher frequencies may be employed, for instance where the crystallizer has a thin wall.

The high value, likewise, depends on the physical and geometric characteristics of a crystallizer but is selected to obtain a very great attenuation by the wall of the crystallizer.

According to the invention the high frequency may suitably be between 100 and 1000 Hz, but lower frequencies may also be employed in correlation with the thickness of the crystallizer.

The fields received by the receiver coils are therefore affected, on the one hand (low frequency), by everything present beyond the crystallizer wall as well as by what takes place in the wall itself and, on the other hand (high frequency), are affected in practice only by what takes place in the crystallizer wall.

The employment of the two frequencies enables the usable signal to be purified by elimination of the false signals generated owing to the effect of the partly random development, in space and time, of the temperature of the crystallizer below the meniscus.

The field received by the receiver coils comprises a direct component generated by the main receiver coil and also reaction components which are substantially the result of currents induced by the main field in the copper of the crystallizer and in the liquid metal which fills the crystallizer wholly or partly.

Each receiver coil is affected also by the whole field restricted to its own zone of influence, which is correlated with the dimensions and position of the coil itself.

The reaction components affect the amplitude and the phase of the voltages induced in the receiver coils.

Two main occurrences are therefore shown in the case of emitter coils which have dimensions that cover the extent of the range of variations of the level of the liquid metal: the phase and amplitude of the lower frequency signal picked up by the main receiver coil vary according to a substantially linear law in a determined field as a function of the filling of the crystallizer with liquid metal. The same phase and amplitude vary also in the same field but with another non-linear law according to the effect of the heating of the crystallizer caused by the presence of the hot metal therein. The signal obtained from the crystallizer is a function of the mean resistivity depending on the means temperature of the wall affected by the main magnetic field. The overall effect of the variation of the level in the crystallizer on the phase and amplitude of the lower frequency signal picked up by the main receiver coil is therefore equal to the sum of the effects determined by the presence of the conductive metal in the crystallizer and by the heating of the crystallizer itself; in a manner analogous to the preceding case, the phase and amplitude of the high frequency signal picked up by the main receiver coil are affected by the presence of liquid metal in the crystallizer, but in this case, owing to the shielding effect of the crystallizer on the magnetic field, practically only the contribution due to the heating of the crystallizer itself is detected.

In both the above cases the signal depending on the mean temperature of the crystallizer contains a random component (noise) determined by recurring occurrences of detachment of the skin of solidifying metal from the inner surface of the crystallizer, such occurrences taking place with greater effect and frequency the greater the distance from the meniscus downwards.

The above shows various alternatives for conducting a measurement of the level of metal in the ingot mould.

a. The measurement of the level as a function of the amplitude and/or phase of the signal of the lower frequency. This measurement is affected and disturbed by the effect of the temperature of the crystallizer through which the field passes.

b. The measurement of the level as a function of the amplitude and/or phase of the signal of the higher frequency. This measurement depends only on the heating of the crystallizer and may therefore give generally a result not perfectly correlated with the level although it is enough for the control of the process in some cases. This method can be used in particular with coils of a limited height of the order of 10 mm–50 mm (reading of the level on a limited field); in this case the disturbing effect cited above regarding detachment of the skin of the metal is minimized.

c. The measurement of the level on the basis of measurement of the level as a function of the amplitude and/or phase of the signal of the lower frequency as compensated by the signal obtained by measurement of the level as a function of the amplitude and/or phase of the signal of the higher frequency. This method gives a more accurate reading since, by a suitable combination of the two signals, for instance by a weighted subtraction of the signals, it is to the variation in the crystallizer temperature, this effect being included in the measurement of level as a function of the amplitude and/or phase of the signal of the lower frequency.

The invention is therefore embodied with a device for the measurement of the level of liquid metal in a crystallizer of a continuous casting ingot mould according to the contents of the main claim or the claims derived therefrom.

The attached figures, which are given as a non-restrictive example, show the following:

FIG. 1 shows a perspective view of an ingot mold according to the present invention, with a portion thereof cut away to show the device fitted;

FIGS. 2a and 2b give two views of an embodiment of the invention;

FIG. 3 shows the mean development of the temperatures of the wall of the crystallizer;

FIG. 4 shows an alternative embodiment relative to that shown in FIGS. 2a and 2b;

Figure 1:
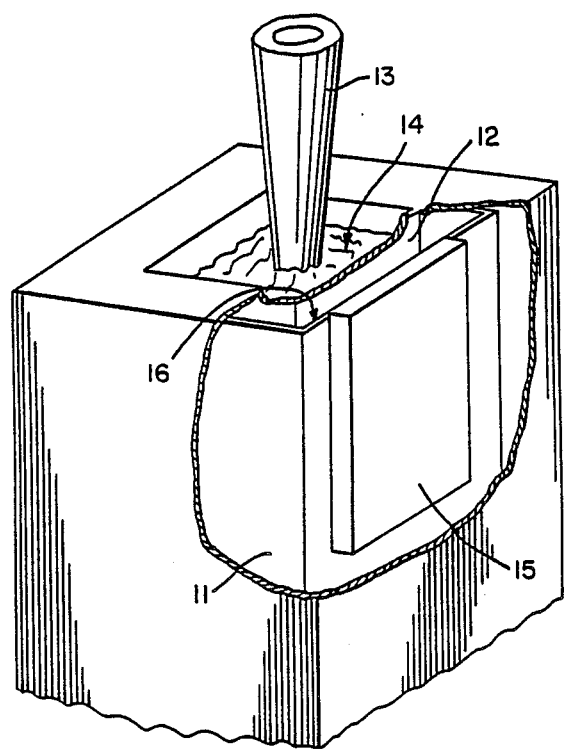
FIG. 1 shows a diagram of a partial ingot mould in which can be seen a cooling fluid conveyor 11 and a crystallizer 12.
Figure 6:
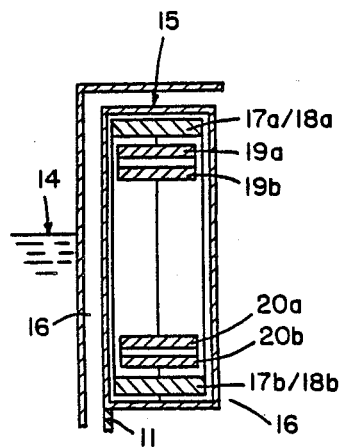
FIGS. 6–8 show alternative embodiments relative to that shown in FIGS. 2a and 2b.

The crystallizer 12 contains a meniscus 14 beneath which a discharge funnel 13 feeds liquid metal in this example.

A container 15 is included in cooperation with the conveyor 11, substantially on one side of the same when the conveyor 11 has a square, rectangular or analogous section, and is in fact immersed in cooling fluid 16 and therefore protected from spurts of molten metal and from the process temperature.

A plurality of coils according to the invention is located in the container 15, which is positioned to cooperate with the maximum and minimum levels which the meniscus 14 may reach.

According to a first embodiment shown in FIGS. 2a and 2b there are an emitter coil 17 and receiver coil 18; these coils 17-18 should possess a given vertical and lateral cover. The vertical cover determines the reading field, whereas the lateral cover affects the depth of penetration of the magnetic field into the crystallizer 12.

Figure 7:
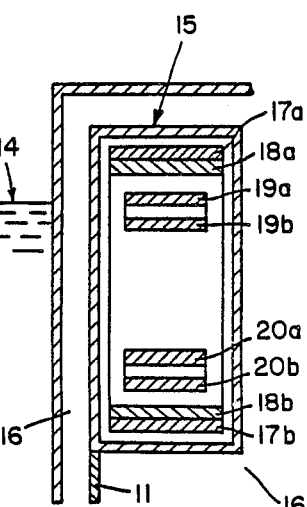
Figure 8:
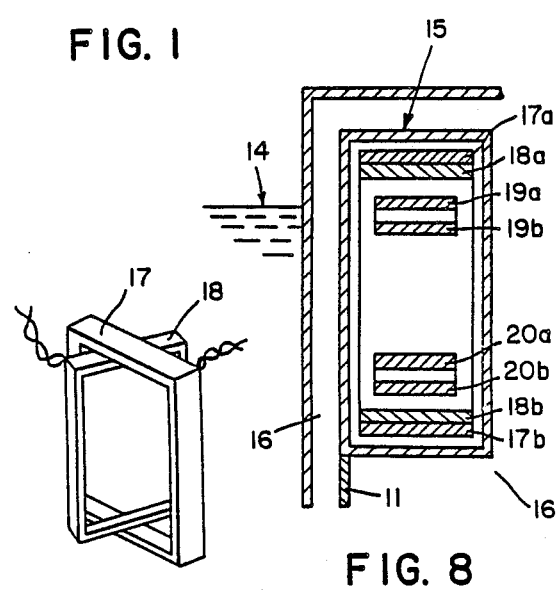

The coils 17-18 may be coupled together and have common axes (as shown in FIGS. 2a and 2b) or be embodied with a two-wire winding, or else one may be placed inside the other (FIG. 7), or lastly they may be positioned on two non-parallel planes. Between the above coils 17-18 are placed two further coils 19-20 to monitor the upper and lower limit levels of the meniscus.

According to a variant the receiver coil 18 consists of a plurality of coils (FIG. 4) which individually monitor a specific vertical sector.

FIG. 3 gives an indicational diagram of the behaviour of the temperature 21 in the crystallizer 12 in relation to the position of the level of the meniscus 14.

Figure 5:
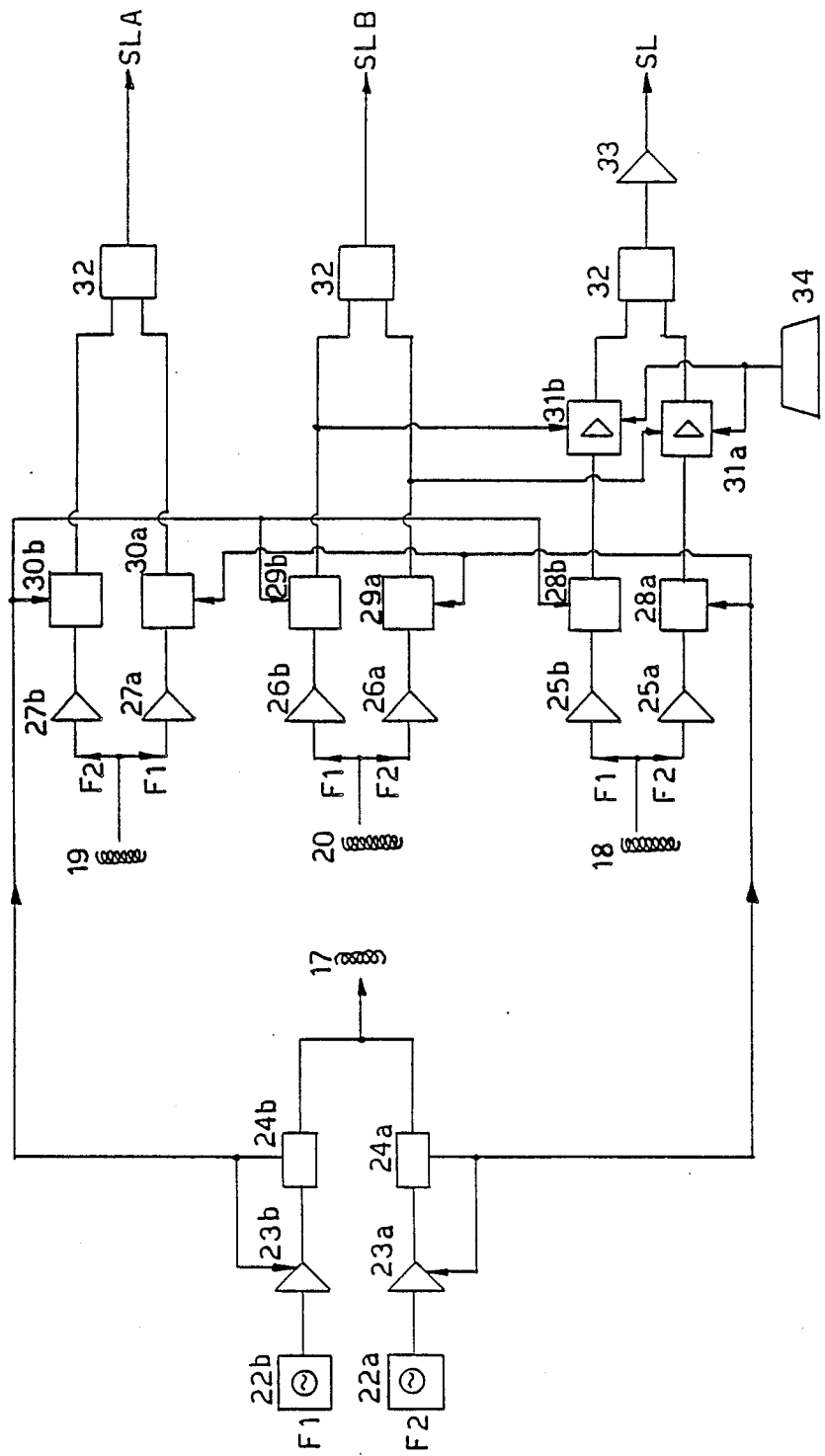
FIG. 5 shows a functional block diagram of the circuit that generates and processes the signals as applied to a possible embodiment.

Each electronic circuit shown in FIG. 5 and associated with the emitter coils consists, in the lay-out of FIGS. 2a and 2b, for each of the two measurement frequencies (F1 and F2), of a signal generator 22 and of a power amplifier with a controller current output 23, which feeds the emitter coil 17 through a current sensor 24.

Each of the receiver coils 18-19-20 is followed, for each of the two measurement frequencies, by an amplifier/filter 25,27 and 26 and by an amplitude-and-phase comparator/discriminator circuit 28, 30 and 29, which converts the variations of parameters of the signals received into analogue level signals.

The level signals thus obtained pass through a normalizer circuit 31, which by means of a manual or automatic procedure fixed their initial value and the scale factor as a function of the operational contour conditions.

The operational contour conditions arriving from 34 may consist of geometric parameters linked to the ingot mould and of preliminary operating sequences.

Initial data for the above procedure are also taken by the lower limit level coil 20 when the meniscus 14 passes in the neighbourhood of that coil 20 at the beginning of the casting.

The signals of level obtained with the circuits operating at the two pre-selected frequencies (high and low) are combined lastly by the circuit 32 so as to eliminate from the level signal determined with the lower frequency the disturbance factors contained in the signal determined with the higher frequency.

The circuit is completed with an output amplifier 33. The final signals are respectively SL which indicate the level of the meniscus 14, SLA which indicates the maximum level and SLB which indicates the minimum level.

In the case of multiple receiver coils 18 as shown in FIG. 4, circuits 25, 28 and 31 are associated with each of the receiver coils 18 and the output signals of the circuits 31 are added together, separately, coil by coil, before entering the circuit 32.

The level may be monitored or determined in different ways with the multiple receiver coils 18 of FIG. 4.

A first method provides for determination in correlation with the specific receiver coil 18 monitoring the maximum among the signals which corresponds to the hottest zone of the crystallizer 12 and therefore to the neighbourhood of the position of the meniscus 14.

After this determination of the peak of the curve 21 (FIG. 3), by processing the signals provided by the individual receiver coils 18 in the neighbourhood of the position of the same peak and taking into account the position occupied by the receiver coils 18 in the arrangement it is possible to obtain, by interpolation for instance, a continuous signal of the level throughout the whole field covered by the group of receiver coils 18.

A second method provides for the monitoring of the individual signals by the specific receiver coils 18 and their addition so as to obtain a signal analogous to that which can be measured with the embodiment of Figs. 2a and 2b.

The first method can be employed suitably by operating with the high frequency alone.

The second method should be used advantageously by working with the system of compensated reading of the signals depending on the high and on the low frequencies.

I claim:

1. A device to measure the level of liquid metal in a crystallizer of a continuous casting ingot mold, said ingot mold having a cooling fluid conveyor surrounding at least a portion of the crystallizer, said device comprising:
   a container disposed on the conveyor and spaced apart from the crystallizer; and
   means for determining the level of liquid metal in the crystallizer, comprising an emitter coil, at least one receiver coil, and a first generator for supplying at least one high frequency to the emitter coil so as to create an electromagnetic field, said determining means being contained within aid container so that the generator, emitter coil and receiver coil are located within the body of the ingot mold, said determining means being coupled electromagnetically to a single wall of the crystallizer and to the volume within the crystallizer, without contacting the crystallizer.

2. The device as claimed in claim 1, wherein said determining means further has a second generator for supplying a low frequency to the emitter coil.

3. The device as claimed in claim 2, wherein the low frequency is determined according to the thickness of the wall of the crystallizer.

4. The device as claimed in claim 2, wherein said at least one receiver coil generates a signal after said first generator supplies the high frequency to the emitter coil and said second generator supplies the low frequency to the emitter coil, wherein the level of the liquid in the crystallizer is determined depending on the factor of filling of the crystallizer and on the mean temperature of the wall of the crystallizer.

5. The device as claimed in claim 1, wherein the at least one high frequency is determined according to the thickness of the wall of the crystallizer.

6. The device as claimed in claim 1, wherein the emitter coil and the at least one receiver coil are wound together as a single two-wire body.

7. The device as claimed in claim 1, wherein the emitter coil and the at least one receiver coil are positioned side by side and are coaxial.

8. The device as claimed in claim 1, wherein the emitter coil and the at least one receiver coil are positioned one inside the other, said emitter coil and said at least one receiver coil each defining an axis, wherein the axis of the emitter coil is angled relative to the axis of the at least one receiver coil.

9. The device as claimed in claim 1, wherein the emitter coil and the at least one receiver coil are positioned one inside the other, and the emitter coil and the at least one receiver coil are coaxial.

10. The device as claimed in claim 1, wherein at least the at least one receiver coil has a vertical height of between 10 mm and 50 mm.

11. The device as claimed in claim 1, wherein said determining means comprises a plurality of receiver coils, said receiver coils being positioned inside the emitter coil.

12. The device as claimed in claim 11, wherein each of said receiver coils generates a signal, and further comprising means for determining which signal from the plurality of receiver coils is maximum, wherein the maximum signal from the plurality of receiver coils is used to approximate the meniscus of the liquid metal in the crystallizer.

13. The device as claimed in claim 11, wherein each of said receiver coils generates a signal, further comprising means for determining a sum of the signals of the plurality of receiver coils, wherein said sum is used to approximate the meniscus of the liquid metal in the crystallizer.

14. The device as claimed in claim 11, wherein said determining means further comprises upper and lower limit receiver coils provided within the emitter coils and positioned approximately at a high level limit and a low level limit of the meniscus of the liquid metal in the crystallizer, respectively.

15. The device as claimed in claim 14, wherein the lower limit receiver coil provides parameters for determining the level of the liquid metal in the crystallizer.

16. The device as claimed in claim 11, wherein said at least one receiver coil generate a signal after said first generator supplies the high frequency to the emitter coil, and wherein said signals are correlated with the means temperature of the wall of the crystallizer so as to determine the level of the liquid in the crystallizer.

* * * * *